United States Patent [19]

Grodek

[11] Patent Number: 5,004,711

[45] Date of Patent: Apr. 2, 1991

[54] PROCESS OF PRODUCING COLLOIDAL ZIRCONIA SOLS AND POWDERS USING AN ION EXCHANGE RESIN

[75] Inventor: Raymond J. Grodek, Seven Hills, Ohio

[73] Assignee: Harshaw/Filtrol Partnership, Cleveland, Ohio

[21] Appl. No.: 423,525

[22] Filed: Oct. 13, 1989

Related U.S. Application Data

[63] Continuation of Ser. No. 130,800, Dec. 9, 1987, abandoned.

[51] Int. Cl.$^5$ .................. C01G 25/02; C04B 35/48
[52] U.S. Cl. .................. 501/103; 501/104; 423/70; 423/608; 252/313.1; 252/315.1
[58] Field of Search ............ 423/70, 608; 252/313.1, 252/315.1; 501/103, 104

[56] References Cited

U.S. PATENT DOCUMENTS

| | | | |
|---|---|---|---|
| 2,438,230 | 3/1948 | Ryznar | 252/313 |
| 2,546,953 | 3/1951 | Strut | 23/19 |
| 2,759,793 | 8/1956 | Lister et al. | 23/19 |
| 2,984,576 | 5/1961 | Alexander et al. | 106/55 |
| 3,032,388 | 5/1962 | McCord et al. | 23/23 |
| 3,157,601 | 11/1964 | Fitch et al. | 252/301.1 |
| 3,259,585 | 7/1966 | Fitch et al. | 252/313.1 |
| 3,282,857 | 11/1966 | Fitch et al. | 252/313 |
| 3,359,213 | 12/1967 | Clearfield | 252/313.1 |
| 3,442,817 | 5/1969 | Luebke | 252/313 |
| 3,676,362 | 7/1972 | Yates | 252/309 |
| 3,850,835 | 11/1974 | Marantz et al. | 252/182 |
| 4,067,745 | 1/1978 | Garvie et al. | 106/57 |
| 4,279,655 | 7/1981 | Garive et al. | 501/20 |
| 4,525,464 | 6/1985 | Claussen et al. | 501/103 |
| 4,565,792 | 1/1986 | Knapp | 501/104 |
| 4,588,576 | 5/1986 | David | 423/608 |
| 4,610,967 | 9/1986 | Imanishi et al. | 501/103 |
| 4,619,817 | 10/1986 | Stambaugh et al. | 501/104 X |
| 4,659,680 | 4/1987 | Guile | 501/104 |
| 4,664,894 | 5/1987 | Suzuki et al. | 423/265 |
| 4,666,467 | 5/1987 | Matsumoto et al. | 51/309 |
| 4,719,091 | 1/1988 | Wusirika | 501/104 X |
| 4,784,794 | 11/1988 | Kato | 423/70 X |

OTHER PUBLICATIONS

"Helpful Hints in Ion Exchange Technology", Rohm and Haas, Nov. 1971.

Blumenthal, Warren B., The Chemical Behavior of Zirconium (D. Van Nostrand Company, Inc., 1959).

*Primary Examiner*—Karl Group
*Attorney, Agent, or Firm*—Renner, Otto, Boisselle & Sklar

[57] ABSTRACT

A method of preparing colloidal zirconium oxide sols having substantially uniformly spherical particles in the size range of from about 0.01 to about 2.0 microns is described. The process comprises the steps of (A) preparing a liquid mixture comprising at least one zirconium salt and a compatible liquid vehicle;

(B) contacting said liquid mixture with an anion exchange resin for a period of time sufficient to form a zirconium hydrate sol having a pH of at least about 5.0; and (C) recovering the zirconium hydrate sol from the resin. Colloidal size zirconium oxide powders can be prepared from the colloidal zirconium oxide sols by drying and calcining the sols at an elevated temperature. The zirconium oxide powders obtained in accordance with the present invention can be stabilized by the incorporation of certain stabilizers such as yttrium oxide, lanthanum oxide, cerium oxide, calcium oxide and magnesium oxide.

19 Claims, No Drawings

PROCESS OF PRODUCING COLLOIDAL ZIRCONIA SOLS AND POWDERS USING AN ION EXCHANGE RESIN

This is a continuation of co-pending application Ser. No. 07/130,800, filed on Dec. 9, 1987, abandoned.

TECHNICAL FIELD OF THE INVENTION

This invention relates to colloidal zirconium oxide sols and a method of preparing colloidal zirconium oxide sols. The preparation of colloidal size zirconium oxide powders also is described.

BACKGROUND OF THE INVENTION

Zirconia sols, or the finely divided crystalline particles obtained from zirconia sols are useful in a variety of applications. These can range from ceramics in which the zirconia serves to bind components together to plastic materials in which zirconia serves a similar function. Likewise, zirconia sols can be used to bind organic acids or other organic compounds such as dyes.

It also is known in the prior art that colloidal zirconium oxide sols can be stabilized by the incorporation of other components such as yttrium oxide. Ceramic bodies made from such stabilized zirconium oxide sols containing, for example, about 5 to 6% by weight of $Y_2O_3$ exhibit high toughness and strength which is not obtained by traditional oxide ceramics. In many applications, the preparation and use of finely divided oxide powders of zirconium is particularly desirable since, in general, the mechanical properties improve with decreasing particle sizes. With the rapid advances in the electronics field, ultra-pure zirconia is desired for use in the production of electronic devices. Thus, there is a continuing need for stronger, more detailed ceramics for high performance electronic devices, and a great deal of effort has been devoted to developing improved zirconia for use as a starting material for the production of such products.

The patent literature contains many suggestions for preparing zirconium oxide having improved properties for various uses. U.S. Pat. No. 2,438,230 describes a method for producing aqueous colloidal solutions (sols) of hydrous oxides of various metals such as aluminum, iron, cobalt, manganese, nickel or other divalent or trivalent metals. The sols are prepared by passing dilute aqueous solutions of the salts capable of forming insoluble hydrous oxides through a suitable anion-exchange material. This patent, however, does not suggest the use of zirconium as one of the metals, the use of an oxy salt such as zirconium oxychloride or the formation of essentially uniform fine particles of about 0.5 micron diameter.

U.S. Pat. No. 2,546,953 and 2,759,793 discuss the use of ion-exchange resins, preferably cationic-exchange resins, to separate zirconium from hafnium. The resin is then eluted with hydrochloric acid or sulfuric acid, and the eluate containing the higher concentration of zirconium is separated and the zirconium is recovered.

U.S. Pat. No. 2,984,576 describes the use, as refractories, of zirconium oxide sols having particles in the range of 0.005 to 0.2 microns in diameter. The sols are prepared from a basic aqueous solution of a zirconium salt such as zirconium oxychloride or other salt such as zirconium nitrate. The salt is hydrolyzed under pressure at a temperature of 120–300° C. for 1–2 hours followed by removal of excess acid. The sol, having a final pH of between 2 and 6 can be concentrated to a desirable concentration, and the salt can be converted to a dry, dispersible powder if desired.

U.S. Pat. No. 3,032,388 describes a process for the production of zirconium oxide from impure zirconium chloride which also contains hafnium which is naturally associated with the zirconium. The impure zirconium chloride is subjected to liquid-liquid extraction to separate the zirconium from the hafnium. The hafnium and zirconium solutions are separately processed to recover the two constituents in pure form. U.S. Pat. No. 3,157,601 describes the preparation of metal sols with two oxide constituents which can be easily hydrolyzed. Such sols include the salts of zirconium, titanium, aluminum, chromium, etc., and the sols are prepared using urea added to the mixture of metal chlorides (e.g., uranous chloride and thorium chloride) followed by passing the sol through an ion-exchange resin. The process described in the '601 patent depends upon the use of two salts which hydrolyze at a different pH thereby resulting in particles composed of two oxides wherein the oxide which hydrolyzes at the higher pH coats the oxide which hydrolyzes at a lower pH.

U.S. Pat. No. 3,282,857 describes the preparation of aquasols of crystalline zirconia and/or hafnia. The sols are prepared by (1) electrodialysis of an aqueous solution of a basic zirconium or hafnium salt followed by (2) autoclaving of the zirconia or hafnia sol at a suitable temperature pressure. During the autoclaving, the pH drops, and electrical conductivity rises as anion is released by the sol particles to the surrounding medium. Alternatively, the first step may involve passing the solution of a basic zirconium or hafnium salt through an anion exchange resin. The product sol resulting from the second step (i.e., autoclaving) may be deionized by stirring it with a weak anion-exchange resin such as Amberlite IR-45. Zirconium oxide and hafnium oxide sols also are described in U.S. Pat. No. 3,442,817, and the sols are prepared from zirconyl or hafnyl acetate by heating to about 175–400° C. which forms colloidal particles which are then treated with a cationic exchange resin to remove free ions of zirconium or hafnium (deionization).

U.S. Pat. No. 3,676,362 describes the preparation of sols of antimony oxide, tin oxide, titanium oxide and zirconium oxide in organic polar liquids. Such sols are prepared by reacting a soluble salt of the metal with water and ammonia in a solution of the liquid. The reaction produces metal oxide in colloidal dispersion and an insoluble ammonium salt which precipitates and is removed by filtration. Sols in liquids which are solvents for organic polymers are used to incorporate metal oxides into polymers to provide flame-resistance and other desirable properties. U.S. Pat. No. 3,850,835 describes a method for producing zirconium hydrous oxide by mixing a zirconium compound such as zirconium oxychloride with a reagent such as a water-soluble phosphate.

U.S. Pat. No. 4,588,576 describes a process for the production of a micro-crystalline metal oxide having an average particle size less than about 1000 Angstroms. Zirconium oxide particles of about 0.1 micron diameter or smaller are described. These particles are spherical in structure and can contain yttria as a minor component. The particles are prepared from a solution containing a soluble zirconium metalorganic compound which is subjected to ultrasonic wave energy to form a gel. The solvent medium is removed from the gelled solution to provide a mass of precursor solids, and the precursor solids are pyrolyzed in the presence of molecular oxygen to form a metal oxide composition.

Various zirconia porcelains and ceramics stabilized with other metal oxides such as cerium oxide, yttrium oxide, calcia, magnesia, etc. are described in a number of patents including, for example, U.S. Pat. Nos. 4,067,745; 4,279,655; 4,525,464; 4,565,792; 4,610,967; 4,659,680; 4,664,894; and 4,666,467.

SUMMARY OF THE DISCLOSURE

A method of preparing colloidal zirconium oxide sols having substantially uniformly spherical particles in the size range of from about 0.01 to about 2.0 microns is described. The process comprises the steps of (A) preparing a liquid mixture comprising at least one zirconium salt and a compatible liquid vehicle;

(B) contacting said liquid mixture with an anion exchange resin for a period of time sufficient to form a zirconium hydrate sol having a pH of at least about 5.0; and (C) recovering the zirconium hydrate sol from the resin.

Colloidal size zirconium oxide powders can be prepared from the colloidal zirconium oxide sols by drying and calcining the sols at an elevated temperature. The zirconium oxide powders obtained in accordance with the present invention can be stabilized by the incorporation of certain stabilizers such as yttrium oxide, lanthanum oxide, cerium oxide, calcium oxide and magnesium oxide.

DESCRIPTION OF THE PREFERRED EMBODIMENTS

One embodiment of the present invention relates to the preparation of colloidal zirconium oxide sols which comprises (A) preparing a liquid mixture comprising at least one zirconium salt and a compatible liquid vehicle;

(B) contacting said liquid mixture with an anion exchange resin for a period of time sufficient to form a zirconium hydrate sol having a pH of at least about 5.0; and (C) recovering the zirconium hydrate sol from the resin.

The first step in the above method involves the preparation of a liquid mixture comprising at least one zirconium salt and a compatible liquid vehicle. Various types of mixtures can be utilized including dispersions, emulsions, solutions, etc., and the type of mixture will be dependent upon the nature of the zirconium salt and the compatible liquid vehicle. Various compatible liquid vehicles may be used including organic liquids and water. In one embodiment, the zirconium salt is soluble in the compatible liquid vehicle and in a preferred embodiment, the compatible liquid vehicle is water and the zirconium salt is soluble in water. Although a variety of zirconium salts can be utilized, the salt is generally one in which the anion corresponds to a strong acid and is monobasic. Examples of such zirconium salts include zirconium oxychloride ($ZrOCl_2 \cdot 8H_2O$), also called zirconyl chloride or basic zirconium chloride, zirconium oxynitrate ($ZrO(NO_3)_2 \cdot 2H_2O$) zirconium nitrate, zirconium chloride, or zirconium sulfate. In one embodiment of the invention, the preferred zirconium salt is zirconium oxychloride. Electronic grade zirconium oxychloride is preferred when the purity of the zirconia sol or powder is important. For example, where silica impurity is to be avoided, an electronic grade zirconium oxychloride containing reduced amounts of silica should be used.

Alternatively, the zirconium salt may be the salt of a low molecular weight carboxylic acid such as zirconyl acetate which is also known as basic zirconium acetate generally believed to be characterized by the formula $$ZrO(C_2H_3O_2)_n \cdot xH_2O$$

The concentration of the zirconium salt in the liquid mixture can be varied. Generally, however, the concentration of the zirconium salt in the compatible liquid will be in the range of from about 0.5% to about 10% by weight, and more particularly in the range of from about 1 to about 4% by weight.

In the second step of the process of the invention, the liquid mixture is brought into contact with an anion exchange resin for a period of time sufficient to form a zirconium hydrate sol having a pH of at least about 5.0. The actual pH of the sol after contact with the resin will depend in part on the type of anionic exchange resin (weak or strong base) and the length of contact. In one embodiment of the present invention, the anion exchange resin utilized in the second step is a weak-base resin, and the liquid mixture is maintained in contact with the weak-base resin until the pH of the liquid mixture is between about 5.5 to about 6.2 and more generally from about 5.9 to about 6.0. At this pH, a zirconium hydrate sol is formed which can be recovered as the reaction product. The pH should not be allowed to reach a level where gellation occurs which is sufficient to clog up the resin column. The optimum pH end point for any resin and zirconium system can be readily determined by experimentation by one skilled in the art. Alternatively the sol can be dried and heated to an elevated temperature (calcined) in the presence of oxygen to form colloidal size zirconium oxide powder.

In one embodiment, a colloidal aqueous sol of zirconium oxide may be prepared by a method comprising the steps of (A) preparing an aqueous solution comprising a water-soluble zirconium salt in water;

(B) contacting said aqueous solution with an anion exchange resin for a period of time sufficient to produce a hydrous zirconium oxide sol having a pH of at least about 5.5; and (C) recovering the hydrous zirconium oxide sol from the anion exchange resin.

In another embodiment, the zirconium hydrate sol recovered from the resin treatment to a pH of about 5.5 to 6.2 can be treated with a basic material to raise the pH to a level of about 7 to about 10 or 11 which results in the precipitation of the colloidal zirconium hydrate sol. The sol can be recovered by decantation or filtration, and may be optionally dried and calcined as described above to form a colloidal size zirconium oxide powder.

Various basic materials can be utilized to raise the pH from about 5-6 to about 7-11. Aqueous alkalies such as KOH and NaOH may be used although aqueous ammonia is preferred since it does not introduce any additional metal impurities.

In one aspect of the immediately preceding embodiment, the aqueous solution in step (A) of the abovedescribed embodiment for making a colloidal aqueous sol of zirconium oxide is maintained in contact with a weak base resin until the pH of the solution is about 6.0 whereupon the solution is separated from the weak base resin, and an aqueous ammonium hydroxide solution is added to the separated solution to raise the pH of the solution up to about 7.0 to about 10.0 whereupon a hydrous zirconium oxide sol precipitates from the solution.

In another embodiment, the anion exchange resin utilized in the process of this invention may be a strong base anionic resin. In this embodiment, the liquid mixture is maintained in contact with the strong base resin until the pH of the mixture is from about 9.0 to about 12.0 and a hydrous sol has been formed. The zirconium hydrate sol is separated from the resin and recovered. The sol may be utilized as formed or converted to colloidal size zirconium oxide powder by drying and calcination. Calcination temperatures of from about 550° C. to about 1100° C. are generally satisfactory, and temperatures of from about 700° C. to about 800° C. are generally utilized.

A variety of weak-base anionic resins and strong-base anionic resins are available commercially, and the nature of the specific anionic resin is not believed to be critical to the present invention. One commercial source of anionic resins which are useful in the method of the present invention is the Rohm & Haas Company which offers a variety of such resins under the general trade designation Amberlite ®. The basic anion exchange resins are generally based on a styrene-divinyl benzene copolymer matrix structure available as macroreticular or gel type resins. The hydroxide or free base ionic form of the resin is utilized since it is desired to prepare hydrous zirconium oxide sols. Specific examples of weakly basic anion exchangers useful in the present invention include the following Amberlite ® materials: IRA-45, 68, 93 and 99. Specific examples of strongly basic anion exchangers include: IRA-400(OH), IRA-900C(OH), and IRA-938(OH).

Contact between the ion exchange resin and the liquid mixture comprising the zirconium salt can be carried out by either column or batch techniques. Column operations are generally preferable. In column operations, the ion-exchange resin is placed in a vertical column to form a bed, and the solution to be treated is passed through the column until a target pH end point is reached. At this point, the zirconium solution or sol is separated from the resin, the resin is rinsed, and the resin may be regenerated to use in another cycle.

In the batch operations, the ion-exchange resin is simply agitated in the vessel together with a given quantity of the zirconium solution to be treated. When the target pH end point is reached, the treated solution is removed by decanting. The resin generally is rinsed and regenerated for use in another cycle.

If the ion-exchange resin to be utilized in the process of the present invention is in the proper ionic form (hydroxyl or free-base), the only conditioning step necessary is a brief rinse with deionized water to remove materials that may have formed or leeched from the resin during storage. If the ion-exchange resin is not in the required form such as, for example, the ionexchange resin recovered from the process of the present invention wherein the hydroxyl group has been replaced by an anion from the zirconium salt, the resin can be converted to the proper form by a regeneration step. Prior to regeneration, the ion-exchange resin should be washed thoroughly to remove any foreign materials, including adsorbed zirconium oxide sols when the resin has been used in the process of the present invention. Regeneration of the resin can be effected either in a batch or in a column process although column operation allows for a high level of regeneration, and the same column used in the process of the present invention can be used for regeneration. Where it is desired, as in the present invention to regenerate ion-exchange resins to the hydroxyl or free-base form, the suggested regenerants are alkaline materials such as alkali metal hydroxides, alkali metal carbonates and ammonium hydroxide. Specific examples include sodium hydroxide, potassium hydroxide, ammonium hydroxide, sodium carbonate, potassium carbonate, potassium bicarbonate, sodium bicarbonate, etc. Generally, the strong base anions will be regenerated with hydroxyl-containing alkaline materials such as aqueous sodium hydroxide. The weak base anion exchange resins can be regenerated with aqueous solutions containing sodium hydroxide, ammonium hydroxide, or sodium carbonate. In general, the aqueous regenerating solutions will contain about 4 to about 10% by weight of the alkaline material. The volume of regenerant should be calculated to insure essentially complete regeneration of the anion exchange resin, and the flow rate of the regenerating solution should also be controlled to provide for maximum regeneration.

The resulting hydrous zirconium oxide sols obtained by either process (weak-base or strong base) generally comprise substantially uniform spherical particles with diameters of 0.5 micron or less, and the particle diameter may be as small as about 0.01 micron and as large as 2.0 micron. The hydrous zirconium oxide sols prepared by either process described above can be concentrated and used in this form. Alternatively, if desired, the sol can be concentrated, spray-dried and calcined to form zirconium oxide powder.

Zirconium oxide sols and powders containing other refractory materials also can be prepared by the process of the present invention. In this embodiment, the liquid mixture prepared in the first step comprises at least one zirconium salt, a compatible liquid vehicle and one or more additional salts of ceramic oxides which generally function as stabilizers in the zirconium hydrate sols and/or zirconium oxide powders. In one embodiment, the liquid mixture prepared in step (A) will contain about 75 to about 99 parts by weight of the zirconium salt and from about 1 to about 25 parts by weight of the stabilizing salt. The zirconium salt and stabilizer salts are converted to the hydrate form in the ion-exchange reaction and later optionally both converted to the oxide forms.

Zirconium oxide bodies can be stabilized, for example, through the inclusion of 1 to about 25% by weight of at least one additional refractory oxide such as yttrium oxide, cerium oxide, aluminum oxide, titanium dioxide, magnesium oxide, calcium oxide, copper oxide, and zinc oxide. Yttrium oxide is a particularly useful stabilizer either alone or in combination with secondary stabilizers such as magnesium oxide, calcium oxide, cerium oxide, etc. The incorporation of the stabilizing oxides in the zirconium oxide sols and powders through the ion exchange process results in improved uniformity of oxide particle distribution and improved thermal stability as well as increased strength.

Although various salts of the stabilizing metal can be utilized in preparing the liquid mixtures used in the process of the present invention, it is preferred that water-soluble salts be utilized. Examples of suitable water-soluble salts include yttrium chloride, yttrium bromide, yttrium nitrate, calcium chloride, calcium bromide, calcium nitrate, magnesium chloride, magnesium bromide, magnesium nitrate, cerium chloride, cerium nitrate, cerium carbonate, copper sulfate, aluminum chloride, titanium chloride, etc.

The following examples illustrate the method of the present invention for preparing colloidal zirconium oxide sols and colloidal size zirconium oxide powders. Unless otherwise indicated in the following examples and elsewhere in the specification and claims, all parts and percentages are by weight and all temperatures are in degrees centigrade.

EXAMPLE 1

A dilute solution is prepared by diluting 100 cc. of zirconium oxychloride to 500 cc. with deionized water. The diluted solution contains 4.2 grams of zirconium oxide, 2.33 grams of chlorine, 0.36 gram of silica and 0.28 gram of sodium ion. The initial pH of the diluted solution is about 1.47. A strong base anion-exchange resin (Rohm & Haas IRA900C(OH)) is soaked in deionized water for 15 minutes prior to use in accordance with recommended procedures. With stirring, 100 grams of the anion-exchange resin are added to the dilute zirconium oxychloride solution over a period of about 5 minutes. There is an immediate formation of a white colloidal precipitate, and the pH of the mixture rises to about 11.94. The precipitate is separated from the resin by pouring through a 60 mesh screen. The resin is washed with about 700 cc. of water. The precipitate is filtered through a No. 42, 9 cm. diameter paper and washed with about 200 cc. of deionized water. A gel-type precipitate is left on the filter paper which is dried at 100° C, ground in a mortar to a fine white powder and calcined at 700° C to convert the powder to zirconium oxide ($ZrO_2$). A sample of the material prepared in this manner is subjected to X-ray analysis which identifies $ZrO_2$ as the major and only crystalline component.

The resin is regenerated by stirring the resin in 500 cc. of deionized water to which is added 10 grams of sodium hydroxide. A white sol of additional $ZrO_2$ is produced and is decanted. The sol is filtered, dried and calcined. The resin is further washed several times to remove trace amounts of the sol. The pH of the washed resin is 9.40.

EXAMPLE 2

A dilute solution is prepared by diluting 25 cc. of electronic grade zirconium oxychloride to 200 cc. with deionized water. The electronic grade zirconium oxychloride analyses as 160 g/l of $ZrO_2$, 98.1 g/l of chlorine and 0.34 g/l of $SiO_2$. The diluted solution is passed upwardly through an ion-exchange column with an anion-exchange resin IRA68 (a weak base resin from Rohm & Haas) over a period of about one hour. The pH of the solution reaches about 5.80. The column is rinsed with deionized water. The solutions recovered from the ion-exchange resin are combined and screened through a 60-mesh screen. On standing, the viscosity of the liquid begins to increase as a gel is formed.

EXAMPLE 3

A solution is prepared by diluting 37.5 cc. of the electronic grade zirconium oxychloride described in Example 2 to 400 cc. with deionized water. The diluted solution contains 1.5% of zirconium oxide. The solution is passed upwardly through an ion-exchange column containing about 75 grams of IRA68 resin a total of 17 times. The initial pH of the solution is about 1.06, and after 17 passes through the ion-exchange resin over a period of about 1.5 hours, the pH of the mixture is 5.77. The column is rinsed with 400 cc. of deionized water which is combined with the primary solution after base solutions are screened through a 60-mesh screen. The pH of the combined solution is raised to about 9.0 with a 10% ammonium hydroxide solution (about 20 cc. of solution). The final pH is 9.24. The contents of the beaker are allowed to settle. The mixture is then filtered depositing a sol on the filter weighing 72.31 grams. The sol is redispersed in 100 cc. of deionized water and spray-dried.

EXAMPLE 4

A solution is prepared by diluting 100 cc. zirconium oxychloride described in Example 1 in 500 cc. of deionized water. With stirring, 100 grams of IRA938(OH) (a strong base anion-exchange resin available from Rohm & Haas) are added in four increments every 15 minutes. The pH of the solution rises from an initial value of 1.38 to about 11.11 with the most rapid rise in pH occurring after the last portion of the ion-exchange resin is added. The mixture is decanted through a 60-mesh screen into a beaker, and additional product is rinsed from the resin with five 200 cc. portions of deionized water. The product is filtered and washed with 300 cc. of water, and the cake is dried at 80–85° C. The cake is then calcined for two hours at 700° C. to produce the desired product having the following composition: 87.1% $ZrO_2$, 8.78% $SiO_2$ and 0.94% sodium as sodium oxide.

EXAMPLE 5

A solution is prepared by diluting 100 cc. of the zirconium oxide chloride described in Example 1 in 500 cc. of deionized water. The pH of the diluted solution is about 1.42. The solution is stirred, and 25 grams of IRA400(OH) are added. After about 15 minutes, the solution becomes slightly turbid and an additional 25 grams of the IRA400(OH) are added. The mixture is stirred for an additional 30 minutes as the pH rises to about 11.40. The solution contains a flocculent white precipitate. The mixture is passed through a 60-mesh screen to remove the precipitate from the resin, and the resin is washed with deionized water to remove additional precipitate from the resin.

EXAMPLE 6

A solution is prepared by diluting 25 cc. of the electronic grade zirconium oxychloride described in Example 2 to 400 cc. with deionized water. The pH of the solution is about 1.34. The solution is passed through an ion-exchange column containing IRA68 resin for a total of 11 passes over a period of about one hour. The pH of the solution after the eleventh pass is about 6.05, and on standing, the solution stabilizes to a pH of about 5.88. The solution is screened through a 60-mesh screen, covered and allowed to stand overnight.

A sample of the zirconium oxide sol solution obtained above is sprayed into a Brinkman Mini Spray Drier using an inlet temperature of about 177–182° C., and an outlet temperature of about 88–142° C. About 1.5 liters of sol solution is treated in this manner producing a dry product weighing 1.91 grams. Some product remains on the walls of the drier and cyclone which is not recovered as product since the apparatus is difficult to clean.

EXAMPLE 7

An aqueous zirconium oxide solution containing 4 grams of zirconium oxide is prepared using the electronic grade zirconium oxychloride described in Example 2. A second solution is prepared by dissolving 0.87 gram of yttrium chloride hexahydrate in 25 cc. of deionized water. This solution contains 0.255 gram of yttrium. The yttrium chloride solution is added to the zirconium oxychloride solution which is then diluted to 400 cc. with deionized water. The diluted solution is then contacted with ion-exchange resin IRA68 contained in an ion-exchange column. The initial pH of the diluted solution is 1.31, and this diluted solution is passed through the ion-exchange column a total of 9 times over a period of about one hour at which time the pH of the solution is about 5.99. The solution is screened through a 60-mesh screen yielding a turbid solution. This solution is adjusted to a pH of about 9.17 using 10% aqueous ammonium hydroxide. A total of 16 cc. of the aqueous ammonium hydroxide is added, and the precipitate formed upon addition of the ammonium hydroxide is allowed to settle overnight. The entire mixture is filtered through a No. 4, 9 cm. diameter paper, and the cake is dried as much as possible on the filter.

EXAMPLE 8

An aqueous solution is prepared from 25 cc. of an electronic grade zirconium oxychloride solution (containing 4 g. $ZrO_2$) and 0.87 gram of $YCl_3.6H_2O$ (0.255 gram Y). This solution is diluted to a total volume of 400 cc. with deionized water. The diluted solution is then subjected to an ion-exchange reaction with IRA68 resin in an ion-exchange column until the pH of the mixture is about 5.9–6.0. The solution reaches this pH after 11 passes through the column over a period of about one hour. The recovered solution together with two rinse solutions obtained by rinsing the ion-exchange resin in the column are combined and allowed to stand. After stabilization, the pH of the stirred solution is about 6.09 and the pH of the settled mixture is 5.88.

The above-prepared sample of $ZrO_2$—$Y_2O_3$ sol is essentially clear except for a slight residue on the bottom of the container. The mixture is stirred and spray-dried at an inlet temperature on the spray drier at about 195–200° C. and an outlet temperature generally of about 100–115° C. An extremely fine powder product is obtained consisting principally of two particle size ranges: 0.5–2 micron and 0.01–0.05 micron.

EXAMPLE 9

A solution is prepared by diluting 25 cc. of the electronic grade zirconium oxychloride described in Example 2 to 375 cc. with deionized water. A second solution is prepared by dissolving 1.35 grams of $YCl_3.6H_2O$ in 25 cc. of deionized water, and this solution is added to the zirconium oxychloride solution with stirring. The combined solution is passed through an ion-exchange column containing about 75 grams of IRA68 resin, and passage through the column is repeated for a total of 7 passes until the pH of the solution is about 6.19. This solution (product) is separated, and the ion-exchange column is rinsed two times with one liter of water. The product solution and the rinse solutions are screened through 60-mesh to remove resin fines and thereafter, the primary solution and the first rinse are combined and treated with ammonium hydroxide solution to a pH of about 9.19. The second rinse solution also is adjusted to a pH of about 9.0 with ammonium hydroxide. Both solutions are allowed to stand overnight and filtered. The residue is the desired sol which is redispersed in 100 cc. of deionized water.

EXAMPLE 10

The general procedure of Example 9 is repeated with the exception that the initial yttrium solution contains 1.86 grams $YCl_3.6H_2O$ whereby the sol comprises 88% $ZrO_2$ and 12% $Y_2O_3$.

EXAMPLE 11

A zirconium oxychloride solution is prepared containing 4 grams of $ZrO_2$ using the electronic grade zirconium oxychloride described in Example 2, and an yttrium solution is prepared by dissolving 0.87 gram of $YCl_3.6H_2O$ (0.255 gram Y) in 25 cc. of water. The zirconium oxychloride solution is diluted to 375 cc. with deionized water, and the yttrium chloride solution (25 cc.) is added with stirring. This mixture is treated with ion-exchange resin IRA68 (about 75 grams) in an ion-exchange column by recirculating the solution through the column for a total of 9 times over a period of about 50 minutes. At this time, the pH of the solution is about 6.0. After removing the treated solution from the ion-exchange column, the ion-exchange resin is rinsed three times with water, and all of the solutions are screened through 60-mesh to remove resin and resin fines. The primary solution and the first rinse solution are combined, and the second and third rinse solutions are combined. The pH of both solutions is adjusted to about 9 with 10% ammonium hydroxide solution. Both solutions form gels and eventually precipitates which settle as flocs. The primary containing solution is filtered through a No. 4 paper and the wet press cake is weighed and recovered. A portion of the press cake is redispersed in deionized water. Another portion of the wet press cake is air dried and then dried at 60° in an oven for 24 hours. The dried cake was ground in a mortar and calcined for two hours at 700° C. The calcined material was analyzed and found to contain 5.5% $Y_2O_3$ and 94.5% $ZrO_2$. X-ray identifies the zirconium oxide as tetragonal and the $Y_2O_3$ as a cubic crystalline component. Scanning electronic microscope micrograph of the sol indicates substantially uniform spherical particles of from 0.05 to about 0.1 micron.

EXAMPLE 12

A solution is prepared by diluting 25 cc. of the electronic grade zirconium oxychloride described in Example 2 to one liter with deionized water. This diluted solution containing 0.4% of $ZrO_2$ is passed through an ion-exchange column containing 100 grams of IRA400 resin. The solution is passed through the column in an upward movement and recirculated through the column for a total period of about 4 hours. The final pH of the solution is about 6.21. The ion-exchange resin is rinsed with two liters of water to remove remaining zirconium oxide sol. The zirconium oxide sol is allowed to stand overnight and filtered. The filter cake is washed with water. A portion of the cake is dispersed in 100 cc. of deionized water and subjected to ultrasonic bombardment for a few minutes to help disperse the sol. The zirconia sol expands and is stable with little settling. The zirconia sol has the appearance of a thick paste. A sample of the sol is examined by scanning electron microscope, and the micrographs indicate very tightly bound particles forming aggregates. The particles have a particle size of about 0.01 micron in aggregates.

EXAMPLE 13

An aqueous zirconium acetate solution is prepared containing 287.5 grams per liter of $ZrO_2$, and 14 cc. of the solution is diluted with deionized water to a volume of 400 cc. The diluted solution is then passed upwardly through a small column containing IRA-68 resin for a total of five passes, and the pH of the solution at this time is 5.5. The column is rinsed with 2500 cc. of deionized water to remove zirconium oxide sol adhered to the resin. The rinse solution is combined with the principal solution and screened through 60-mesh to remove resin beads. The pH of the screened solution is adjusted to about 9.0 with a 10% ammonium hydroxide solution. The sol is allowed to settle and is filtered. The solid is reslurried in a small amount of deionized water. A scanning electron microscope photograph of the reslurried sol indicates a basic particle size of 0.03 to 0.3 micron, and single as well as aggregate particles are observed.

The resin is regenerated by treatment with an alkaline solution obtained by dissolving 30 grams of sodium hydroxide in 1600 cc. of deionized water. The alkaline solution is passed in a downward flow mode through the ion-exchange column. Excess sodium is washed from the resin with additional water.

The zirconium oxide sols and powders prepared in accordance with the process of the present invention can be utilized in a wide range of applications and compositions. In such compositions, the zirconium oxide sols and powders generally have a binding effect in addition to other valuable effects. For example, zirconium oxide sols and powders can be incorporated into elastomers and into organic plastics to strengthen and reinforce these polymers. The zirconium oxide sols and powders can be added as a dispersion to the polymers in latex form or they can be melted into the polymers or added along with various intermediates.

Zirconia sols also are useful as sizing agents for fabrics and textiles to improve soiling resistance and static build-up. They are also useful for reducing sheen on synthetic fibers and can be used in leather tanning compositions.

Because of the adsorptive capacity and thermal stability of colloidal zirconium oxide, it finds use in the formulation and modification of solid rocket propellants for combustion control, and when in the form of colloidal sols, colloidal zirconia is an effective agent in liquid fuels for flame propagation control. Zirconium oxide powders and sols are useful in varnishes, nitrocellulose, lacquers and alkyd finishes in providing high opacity and hiding powder without detracting from the smoothness, toughness or other qualities of the finish. Because of the adsorptive capacity of colloidal zirconia, it also finds use in such applications as cigarette filters, antiperspirants, deodorizers, drugs and medicines.

While the invention has been explained in relation to its preferred embodiments, it is to be understood that the various modifications thereof will become apparent to those skilled in the art upon reading this specification. Therefore, it is to be understood that the invention disclosed herein is intended to cover such modifications as fall within the scope of the appended claims.

I claim:

1. A method of preparing colloidal zirconium oxide sols comprising
   (A) preparing a liquid mixture comprising at least one zirconium salt and a compatible liquid vehicle;
   (B) contacting said liquid mixture with a strong base anion-exchange resin for a period of time sufficient to form a hydrous zirconium oxide sol having a pH of from about 9.0 to about 12.0; and
   (C) recovering the hydrous zirconium oxide sol from the resin.

2. The method of claim 1 wherein the liquid vehicle is water and the zirconium salt is soluble in water.

3. The method of claim 1 wherein the zirconium salt is a zirconium oxy chloride, zirconium acetate, or zirconium nitrate.

4. The method of claim 2 wherein the concentration of the zirconium salt in the water is from about 0.5% to about 10% by weight.

5. The method of claim 1 wherein the liquid mixture prepared in step (A) also contains one or more salts of magnesium, calcium, yttrium or cerium.

6. A method of preparing colloidal size zirconium oxide comprising drying the hydrous zirconium oxide sol prepared in accordance with the method of claim 1, and thereafter calcining the dried sol at a temperature of from about 550° C. to about 1100° C. to form the desired zirconium oxide.

7. A method of preparing a colloidal zirconium, oxide sol comprising
   (A) preparing a liquid mixture comprising at least one zirconium salt, at least one salt of magnesium, calcium, yttrium or cerium, and a compatible liquid vehicle;
   (B) contacting said liquid mixture with an anion exchange resin for a period of time sufficient to produce a hydrous zirconium oxide sol having a pH of at least about 5.0; and
   (C) recovering the hydrous zirconium oxide sol from the anion-exchange resin.

8. The method of claim 7 wherein the liquid vehicle is water and the zirconium salt is soluble in water.

9. The method of claim 8 wherein the concentration of the zirconium salt in the water prepared in step (a) is from about 0.5% to about 10% by weight.

10. The method of claim 7 wherein the zirconium salt is zirconium oxy chloride, zirconium acetate, or zirconium nitrate.

11. The method of claim 7 wherein the liquid mixture contains from about 76–99 parts by weight of the zirconium salt and from about 1 to about 25 parts by weight of the magnesium, calcium, yttrium or cerium salt.

12. A method of preparing colloidal size zirconium oxide comprising drying the hydrous zirconium oxide sol prepared in accordance with the method of claim 7, and thereafter calcining the dried sol at a temperature of from about 550° C. to about 1100° C. to form the desired zirconium oxide.

13. A method of preparing spherical colloidal size zirconium oxide particles comprising
   (A) preparing a liquid mixture comprising at least one zirconium salt and a compatible liquid vehicle;
   (B) contacting said liquid mixture with an anionexchange resin for a period of time sufficient to form a hydrous zirconium oxide sol having a pH of at least about 5.0;
   (C) recovering the hydrous zirconium oxide sol from the resin; and
   (D) drying the hydrous zirconium oxide sol of (C) and thereafter calcining the dried sol at a temperature of from about 550° C. to about 1100° C. to form the spherical colloidal size zirconium oxide particles wherein the zirconium oxide particles are substantially uniform particles with diameters in the range from 0.01 micron to 2.0 microns.

14. The method of claim 13 wherein the liquid vehicle is water and the zirconium salt is soluble in water.

15. The method of claim 13 wherein the zirconium salt is a zirconium oxy chloride, zirconium acetate, or zirconium nitrate.

16. The method of claim 14 wherein the concentration of the zirconium salt in the water is from about 0.5% to about 10% by weight.

17. The method of claim 13 wherein the liquid mixture of (A) also contains one or more salts of magnesium, calcium, yttrium or cerium.

18. The method of claim 17 wherein the liquid mixture contains from about 75-99 parts by weight of the zirconium salt and from about 1 to about 25 parts by weight of the magnesium, calcium, yttrium or cerium salt.

19. The method of preparing colloidal zirconium oxide sols according to claim 13 wherein the liquid mixture of (A) is an aqueous solution comprising a zirconium salt in water at a concentration of about 0.5% to about 10% by weight and (B) comprises contacting said aqueous solution with an anion-exchange resin for a period of time sufficient to produce a hydrous zirconium oxide sol having a pH of at least about 5.5.

* * * * *